United States Patent [19]

Binsack et al.

[11] Patent Number: 4,686,262

[45] Date of Patent: Aug. 11, 1987

[54] THERMOPLASTIC BLOCK COPOLYESTERS, A PROCESS FOR THE PREPARATION THEREOF AND THEIR USE FOR THE PRODUCTION OF MOULDINGS

[75] Inventors: Rudolf Binsack; Karl-Heinz Köhler, both of Krefeld, Fed. Rep. of Germany; Ulrich Grigo, New Martinsville, W. Va.; Leo Morbitzer, Cologne, Fed. Rep. of Germany; Ludwig Bottenbruch, Krefeld, Fed. Rep. of Germany; Walter Heitz, Kirchhain, Fed. Rep. of Germany

[73] Assignee: Bayer Aktiengesellschaft, Leverkusen, Fed. Rep. of Germany

[21] Appl. No.: 330,766

[22] Filed: Dec. 14, 1981

[30] Foreign Application Priority Data

Dec. 19, 1980 [DE] Fed. Rep. of Germany ....... 3047927

[51] Int. Cl.$^4$ ............................................. C08G 81/02
[52] U.S. Cl. .................... 525/177; 525/171; 525/445; 528/303; 528/304; 528/308; 528/308.7
[58] Field of Search ...................... 525/171, 177, 445; 528/303, 304, 308, 308.7

[56] References Cited

U.S. PATENT DOCUMENTS

| | | | |
|---|---|---|---|
| 3,598,882 | 8/1971 | Brinkmann | 525/177 |
| 3,853,815 | 12/1974 | Lubowitz | 260/63 R |
| 3,969,306 | 7/1976 | Borman | 525/177 |
| 4,207,230 | 6/1980 | Bier | 525/177 |

FOREIGN PATENT DOCUMENTS

| | | |
|---|---|---|
| 2032818 | 3/1971 | Fed. Rep. of Germany . |
| 1720727 | 7/1971 | Fed. Rep. of Germany . |
| 2458472 | 6/1975 | Fed. Rep. of Germany . |
| 2801145 | 7/1978 | Fed. Rep. of Germany . |

OTHER PUBLICATIONS

Boor, J., *Ziegler-Natta Catalysts and Polymerization,* Academic Press, N.Y. p. 53, 1979.
Raff, R., *Crystalline Olefin Polymers,* Interscience Publishers, N.Y. p. 139, 1965.
Journal of Polymer Science, vol. XLIX, issue 152, pp. S9 to S11 (1961).

*Primary Examiner*—John C. Bleutge
*Assistant Examiner*—Patricia A. Short
*Attorney, Agent, or Firm*—Connolly & Hutz

[57] ABSTRACT

Block copolyesters based on polyalkylene terephthalates which contain polydiene blocks show an extremely low deformation even when they are processed into thin articles. They still have a crystallinity which is decreased by less than the ratio corresponding to the polydiene portion.

9 Claims, No Drawings

THERMOPLASTIC BLOCK COPOLYESTERS, A PROCESS FOR THE PREPARATION THEREOF AND THEIR USE FOR THE PRODUCTION OF MOULDINGS

This invention relates to thermoplastic block copolyesters which are suitable for the production of barely deformable, but nevertheless highly crystalline mouldings, a process for the preparation of these block copolyesters from (a) reactive polydiene derivatives, (b) dicarboxylic acids or their reactive derivatives and (c) diols, and the use of these thermoplastic block copolyesters for the production of mouldings, mainly for the production of injection-moulded articles.

Thermoplastic polyesters have become increasingly significant as raw materials for fibres and as resin components for moulding compositions, due to their valuable technological characteristics, for example their rigidity, hardness, abrasion-resistance and dynamic-and thermal-carrying capacity. Particularly those polyesters based on terephthalic acid, ethylene glycol, butane diol-1,4 or 1,4-dimethylol cyclohexane are readily used because of their high crystallinity.

An undesirable characteristic of these polyesters is their deformation. Deformation mainly occurs where thin parts are concerned, being particularly prominent in the case of glass fibre reinforcement and it severely restricts the use of the polyesters. It has already been proposed to reduce the deformation by adding aromatic polyesters (German Offenlegungsschrift No. 3,002,814 and European Patent application No. 0,012,505) or by adding fillers, but this was at the cost of a decrease in crystallinity which was at least proportional to the quantity of the additive introduced but was very often higher than this. In other words: the deformation could only be avoided by simultaneously giving up to some extent the most important characteristic which makes the polyester in question so desirable, that is the crystallinity. Therefore, there was a need for a method which enabled the deformation of thermoplastic crystalline polyesters to be reduced, while at the same time substantially maintaining the crystallinity, i.e. the decrease in crystallinity should at the most be proportional to the quantity of material added, but it should preferably be lower.

In the following, the relative crystallinity, defined by the quotients:

$$\frac{\text{Melting enthalpy of the modified polyester}}{\text{Melting enthalpy of the unmodified polyester}}$$

applies as a measurement of the decrease in crystallinity, in each case measured during a second heating period (the standardized first heating procedure, followed by a standardized cooling and a standardized second heating procedure, for example at a rate of 20°/minute, ensures the uniformity of the pre-treatment) and based on the unmodified polyester as a standard (relative crystallinity = 1).

If, for example, and addition of 30% pigment reduced the melting enthalpy of a polybutylene terephthalate from 51 J/g to 31 J/g, then this decrease would be overproportional, because the relative crystallinity 31/51 would be 0.608 and would hence be proportional only for a pigment addition of 39.2%.

It has now been found that block copolyesters based on polyalkylene terephthalates which contain polydiene blocks show an extremely low deformation even when they are processed into thin parts, but they still have a crystallinity which, in comparison to the crystallinity of the unmodified polyalkylene terephthalate, decreases by less than the ratio corresponding to the polydiene portion. This result was all the more surprising, since it could not be expected of polydienes, i.e. elastomers, that they would contribute to the crystallinity, but instead, it had to be assumed that they would severely disrupt the crystallinity.

Thus the present invention provides block copolyesters having a relative viscosity (measured in phenol/o-dichlorobenzene, weight ratio of 1:1 at 25° C.) of from 1.15 to 3.0, preferably from 1.3 to 2.5, which consist of the following, the terminal groups not being considered:

(A) from 1 to 60% preferably from 10 to 50%, in paticular from 16 to 45% by weight, based on the block copolyester, of long-chain units of the following formula:

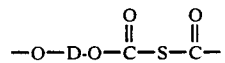

and/or

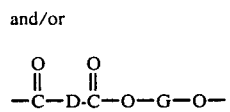

and/or

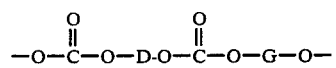

and (B) from 40 to 99, preferably from 50 to 90, in particular fromm 55 to 84% by weight, based on the block copolyester, of short-chain units of the following formula:

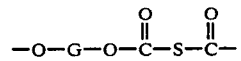

characterised in that (D) represents a divalent polydiene radical containing at least 50 mol %, preferably at least 70 mol % of 1,4-bonds, terminal-positioned bonding points and having an average molecular weight $\overline{M}_n$ of from 400 to 5,000, preferably from 450 to 3,000, in particular from 500 to 1,200 and side chains which may be present must be methyl and/or vinyl groups, G represents a divalent aliphatic radical having from 1 to 12 carbon atoms and/or a divalent cycloaliphatic radical having from 6 to 12 carbon atoms, of a molecular weight of less than 300, and at least 70 mol % of G represent a uniform radical, S represents a direct bond or a divalent aliphatic, cycloaliphatic and/or aromatic radical having from 1 to 14 carbon atoms and having a molecular weight of less than 300, and at least 70 mol % of S are 1,4-phenylene radicals.

"Terminal groups" in this context are monovalent radicals derived from the starting compounds used and together with the partial structures Ia, Ib and/or Ic and II, form the macromolecule of the block copolyesters according to the invention, but do not themselves contain any of the partial structures Ia–Ic or II.

The "long-chain unit" A is the radical of a reaction product.

(a) of a hydroxyl-terminated polydiene with a dicarboxylic acid or the reactive derivative thereof, see formula Ia;

(b) of a carboxyl-, alkylcarboxy-, cycloalkylcarboxy-, benzylcarboxy- or arylcarboxy-terminated polydiene with a diol, see formula Ib;

(c) of an alkylcarbonate-, cycloalkylcarbonate-, benzylcarbonate- or arylcarbonate-terminated polydiene with a diol, see formula Ic.

Another aspect of the present invention is a process for the preparation of block copolyesters having a relative viscosity (measured in phenol/o-dichlorobenzene weight ratio of 1:1, at 25° C.) of from 1.15 to 3.0, preferably from 1.3 to 2.5, characterised in that:

1. hydroxyl-, carboxyl, alkylcarboxy-, cycloalkylcarboxy,- benzylcarboxy-, arylcarboxy-, alkylcarbonate-, cycloalkylcarbonate-, benzylcarbonate- or arylcarbonate-, terminated polydienes, wherein the polydiene radical contains at least 50 mol %, preferably at least 70 mol % of 1,4-bonds, terminal-positioned bonding points and has an average molecular weight $\overline{M}_n$ of from 500 to 5000, preferably from 450 to 3000, in particular from 500 to 1200 and side groups which may be present must be methyl and/or vinyl groups, are transesterified or esterified with 2. at least one dicarboxylic acid derivative of the following formula:

$$R^1-\overset{O}{\underset{\|}{O C}}-S-\overset{O}{\underset{\|}{C O R^2}}$$

wherein $R^1$ and $R^2$ represent a hydrogen atom or a $C_1$–$C_{10}$-alkyl groups, and S is as previously defined, and 3. at least one diol of the following formula:

HO-G-OH wherein

G is as previously defined above, and the mixture is then polycondensed until the required viscosity is obtained, the quantities of the starting components being selected such that the resulting block copolyester, not included the terminal groups, contains the following:

from 1 to 60% preferably from 10 to 50%, in particular from 16 to 45% by weight of long-chain units of formula Ia, Ib and/or Ic, and from 40 to 99%, preferably from 50 to 90%, in particular from 55 to 84% by weight of short-chain units of formula II.

A further object of the present invention is the use of these block copolyesters for the production of mouldings, in particular for the production of injection moulded articles.

The polydiene derivatives preferred for the preparation of the block copolyesters according to the invention are derivatives of butadiene, isoprene, chloroprene and 2,3-dimethylbutadiene. They contain two terminal-positioned reactive groups. Polydiene derivatives of this type are known; they may be prepared by bulk polymerisation in the presence of radical-forming initiators, for example, dialkylperoxydicarbonates or azodicarboxylic acid esters (German Offenlegungsschrift Nos. 2,900,880 and 2,908,298). The polydienes having terminal-positioned hydroxyl groups may be prepared from polydienes having terminal-positioned carbonate ester groups by hydrolysis or they may be prepared from polydienes having terminal-positioned carboxylic acid ester groups by reduction of the ester group.

The average molecular weights of the polydiene components are determined by vapour pressure osmometry in benzene.

The diols HO-G-OH which are preferred for the preparation of the block copolyesters according to the invention are ethylene glycol, propanediol-1,3, butanediol-1,4, hexandiol-1,6 and cyclohexanedimethanol-1,4, The dicarboxylic acids forming a basis for the dicarboxylic acids HOOC-S-COOH or the dicarboxylic acid derivatives $R^1OOC-S-COOR^2$ which are preferred for the preparation of the block copolyesters according to the invention the following: oxalic acid, malonic acid, succinic acid, glutaric acid, adipic acid, pimelic acid, azelaic acid, sebacic acid and in particular, cyclohexanedi-carboxylic acids, for example cyclohexane dicarboxylic acid-1,4, and adipic acid.

Aromatic dicarboxylic acids are a particularly preferred class of dicarboxylic acids. Examples of suitable aromatic dicarboxylic acids include the following: isophthalic acid, terephthalic acid, diphenyldicarboxylic acid-1,4 bis-(p-carboxyphenyl)-methane, naphthalinedicarboxylic acid-1,5, and 2,6.

The most preferred diols are ethylene glycol and butanediol-1,4. The most preferred dicarboxylic acid is terephthalic acid.

The pollydiene units D and the dicarboxylic acid units:

$$\overset{O}{\underset{\|}{O C}}-S-\overset{O}{\underset{\|}{C O}}$$

which are used for the preparation of the block copolyesters according to the invention are incorporated into the block copolyester in molar amounts, in which they are used in the reaction mixture. The diol HO-G-OH, even when it is present in excess in the reaction mixture, is incorporated chemically into the block copolyester, being equimolar to the total of the dicarboxylic acid derivatives $R^1OOC-S-COOR^2$ used and the polydienedicarboxylic acid HOOC-D-COOH used, or as the equimolar difference of the dicarboxylic acid derivatives $R^1$-OOC-S-COOR$^2$ used and the polydiene-diol HO-D-OH used or the polydiene-dicarbonate ester. If mixtures of diols HO-G-OH are used, then the quantity of the incorporated diols depends on the boiling points and on the relative reactivities of the diols.

Block copolyesters which are preferred according to the invention are reaction products of terephthalic acid (dimethylester), butanediol-1,4 or ethylene glycol and the diols, dicarboxylic acids, dicarboxylic acid dialkylesters or dicarbonates of polybutadiene, poly-2,3-dimethylbutadiene, polychloroprene and in particular polyisoprene.

The block copolyesters according to the invention may be as terminal groups, in each case based on the partial structures Ia–Ic or II, for example, carbonyl-positioned: hydroxyl, O-$C_1$-$C_{10}$-alkyl, oxy-positioned:

hydrogen and carbonate-positioned: alkyl or cycloalkyl having from 1 to 12 carbon atoms.

The viscosity of the block copolyesters of the invention may be measured, for example, in an Ubbelohde viscosimeter.

The block copolyesters according to the invention may be prepared according to the preparation processes which are conventional for thermoplastic polyesters. Thus, the first step of the reaction consists of a transesterification step if the esters of the dicarboxylic acid or of the polydiene-dicarboxylic acid are used, or it consists of an esterification step if the respective free dicarboxylic acids are used. A combination of esterification and transesterification is possible in the first reaction stage, namely when dicarboxylic acid esters and free dicarboxylic acid are used. The normal polycondensation process at elevated temperatures and reduced pressure is carried out subsequent to the first reaction stage of transesterification or esterification.

It has proved to be advantageous initially to react the polydiene derivative which is used with an excess of dicarboxylic acid (diester) $R^1OOC-S-COOR^2$, when polydiene diols or polydiene-dicarbonate esters are used, and with an excess of diol HO-G-OH, when polydienedicarboxylic acid (diesters) are used.

In order to increase the molecular weight of the block copolyesters achieved during polycondensation in the melt, it may be advisable to combine with a solid phase polycondensation process which is known for thermoplastic polyesters. In this process, the mixture is usually heated at from 5° to 50° C. below the melting point of the polyester in a flow of inert gas or under vacuum until the desired molecular weight is obtained.

The block copolyesters according to the invention have extremely high melting points, based on the polydiene portion. Moreover, they are also distinguished as already mentioned, by a surprisingly high crystallinity, which may be recongnized from the only slightly reduced melting temperature and from the melting nethalpy of the crystalline portions.

The block copolyesters according to the invention may be modified in conventional manner. They may contain, for example, reinforcing materials and fillers, flame-proofing agents, stabilizers, nucleation agents, lubricants, mould-release agents, dyes and pigments.

The reinforcing materials and fillers which are used to increase the rigidity and strength are used in conventional quantities of from 5 to 40% by weight, based on the total of the block copolyester and additives. Examples of such materials include: kaolin, quartz, mica, woolastonite, talcum, titanium dioxide, aluminium oxide, and preferably glass fibres.

Flameproofing agents include the compounds known for thermoplastic polyesters for example, organic halogen compounds, such as deca- and octa-bromodiphenyl and tetra-bromobisphenol polycarbonate. Another flame-proofing agent is usually used which acts as a synergist, preferably antimony trioxide. The quantities of flameproofing agent to be used are generally from 10 to 25% by weight, based on the total weight of all the components.

The block copolyesters according to the invention may be worked into the most varied mouldings, for example into car-body parts, according to the injection mouldings and extrusion processes which are typical of thermoplastic moulding compositions.

EXAMPLES

Preparation of polybutadiene dicarboxylic acid dimethylester

The polybutadiene dicarboxylic acid dimethylester used in the following Examples was prepared by the bulk polymerisation of butadiene in the presence of azoisobutyric acid methylester according to German Offenlegungsschrift No. 2,900,880. Products were obtained having a molecular weight of 750 (type A) and 1200 (type B) (molecular weight $\overline{M}_n$ determined as an average, measured by vapour pressure osmometry in benzene).

The mol percentage of 1,4-bonds is 78 for type A and 80 for type B.

Preparation of polyisoprenedicarboxylic acid dimethlester

This was prepared in analogous manner to the preparation of polybutadienedicarboxylic acid dimethylester. The resulting product had a molecular weight of 900 (determined as an average $\overline{M}_n$ by vapour pressure osmometry in benzene) and contained 76 mol % of 1,4-bonds (type C).

Preparation of the block copolyesters

EXAMPLES 1 TO 5

The following reaction components were reacted for 1 hour at 200° C. in a reaction vessel provided with a stirrer and with means for distillation, under a nitrogen atmosphere:

100.9 parts by weight of butanediol-1,4,
Y parts by weight of polybutadienedicarboxylic acid dimethyl ester, type A, and
0.092 parts by weight of titaniumtetra-isopropylate.

After the methanol had been split off, Z parts by weight of dimethylterephthalate were added to the reaction mixture.

The mixture was then stirred for 3 hours at 200° C. under a nitrogen atmosphere, and methanol was distilled off. The temperature of the reaction mixture was then increased to 250° C. over a period of 30 minutes, while the pressure in the reaction vessel was simultaneously decreased from normal pressure to approximately 0.5 torr. The reaction mixture was stirred for 40 minutes under these conditions with the viscosity of the melt considerably increasing towards the end of the reaction. The resulting block copolyester was spun off in water, crushed and after drying, was injected into standard small rods at 250° C. on a conventional injection moulding machine.

The melting temperature and melting heat of the crystalline portions of the block copolyesters were determined by differential-thermoanalysis (DSC method). The results are given in Table 1.

TABLE 1

| Example | DMT[1] Z [Parts by weight] | Polybutadiene-dicarboxylic acid dimethylester, Y [parts by weight] | % by weight[2] | block copolyester rel. viscosity[3] | Mp.[4] [°C.] | Melting enthalpy[5] (J/g) |
|---|---|---|---|---|---|---|
| 1 | 155.3 | 17.6 | 9.4 | 1.45 | 221 | 48 |
| 2 | 155.3 | 44 | 20.6 | 1.38 | 218 | 42 |
| 3 | 155.3 | 76 | 30.9 | 1.35 | 213 | 38 |
| 4 | 116.5 | 88 | 40.9 | 1.33 | 210 | 37 |
| Comparison | 155.3 | — | — | 1.48 | 225 | 51 |

[1]Dimethylterephthalate
[2]Based as ester portion on the total block copolyester
[3]Measured in phenol/o-dichlorobenzene (1:1 parts by weight) at 25° C. in an Ubbelohde viscosimeter
[4]Maximum of the main melting temperature, measured according to the DSC method, during second heating operation
[5]Total melting enthalpy, measured according to the DSC method during second heating operation

EXAMPLES 6 TO 9

The reaction was carried out in analogous manner to Examples 1 to 5. The following were used:
100.9 parts by weight of butanediol-1,4,
Y parts by weight of polybutadienedicarboxylic acid dimethylester type B,
155.3 parts by weight of dimethylterephthalate, and
0.092 parts by weight of titaniumtetra-isopropylate.

The block copolyesters were processed and tested in analogous manner to Examples 1 to 5. The results are given in Table 2.

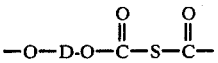 Ia and/or

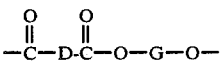 Ib and/or

 Ic

TABLE 2

| Example | polybutadiene-dicarboxylic acid-dimethylester, type B [parts by weight] | % by weight[2] | Block copolyester relative viscosity[3] | M.p[4] [°C.] | Melting enthalpy[5] [J/g] |
|---|---|---|---|---|---|
| 6 | 9.7 | 5.3 | 1.52 | 224 | 50.3 |
| 7 | 20.4 | 10.6 | 1.39 | 223 | 49.8 |
| 8 | 44.8 | 20.6 | 1.34 | 222 | 45.7 |
| 9 | 77.5 | 31.0 | 1.33 | 218 | 38.5 |

[2-5]As explained in Table 1.

EXAMPLES 10 TO 11

100.9 parts by weight of butanediol-1,4, Y parts by weight of polyisoprenedicarboxylic acid dimethylester of type C, 155.3 parts by weight of dimethylterephthalate and 0.092 parts by weight of titaniumtetra-isopropylate were reacted in analogous manner to Examples 1 to 9.

The results of the tests on the resulting block copolyesters are given in Table 3.

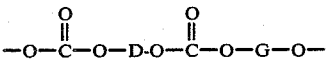

and (B) from 40 to 99% by weight, based on the block copolyester, of short-chain units of the following formula:

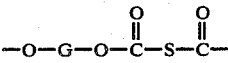 II

TABLE 3

| Example | Polyisoprene-dicarboxylic acid-dimethylester, Type C Y [parts by weight] | % by weight[2] | Block copolyester relative viscosity[3] | M.p.[4] [°C.] | Melting enthalpy[5] [J/g] |
|---|---|---|---|---|---|
| 10 | 35.0 | 16.9 | 1.38 | 221 | 46.1 |
| 11 | 60.0 | 25.9 | 1.36 | 218 | 40.9 |

[2-5]As explained in Table 1.

We claim:
1. Block copolyesters having a relative viscosity (measured in phenol/o-dichlorobenzene, weight ratio of 1:1, at 25° C.) of from 1.15 to 3.0, which consist of the following, the terminal groups not being considered:
(A) from 1 to 60% by weight, based on the block copolyester, of long-chain units of the following formula:

characterised in that
D represents a divalent polydiene radical containing at least 50 mol % of 1,4-bonds, terminal-positioned bonding points and having an average molecular weight $\overline{M}_n$ of from 400 to 5000 and side chains which may optionally be present must be methyl and/or vinyl groups;

G represents a divalent aliphatic radical having from 1 to 12 carbon atoms, and/or a divalent cycloaliphatic radical having from 6 to 12 carbon atoms with a molecular weight of less than 300, at least 70 mol % of G representing a uniform radical;

S represents a direct bond or a divalent aliphatic, cycloaliphatic and/or aromatic radical having from 1 to 14 carbon atoms and having a molecular weight of less than 300, at least 70 mol % of S being 1,4-phenylene radicals.

2. Block copolyesters according to claim 1, characterised in that they have a relative viscosity (measured in phenol/o-dichlorobenzene, weight ratio of 1:1, at 25° C.) of from 1.3 to 2.5.

3. Block copolyesters according to claim 1 or 2, characterised in that they contain the following:
(A) from 10 to 50% by weight of long-chain units, and
(B) from 50 to 90% by weight of short-chain units.

4. Block copolyesters according to claim 1, characterised in that they contain the following:
(A) from 16 to 45% by weight of long-chain units, and
(B) from 55 to 84% by weight of short-chain units.

5. Block copolyesters according to claim 1, characterised in that D represents a radical containing at least 70 mol % of 1,4-bonds.

6. Block copolyesters according to claim 1, characterised in that D represents a radical having an average molecular weight $\overline{M}_n$ of from 450 to 3000.

7. Block copolyesters according to claim 1, characterised in that D represents a radical having an average molecular weight $\overline{M}_n$ of from 500 to 1200.

8. Block copolyesters according to claim 1, characterised in that G represents an ethylene radical or a 1,4-butylene radical.

9. Block copolyesters according to claim 1, characterised in that S represents a 1,4-phenylene radical.

* * * * *